(No Model.)
W. RAPP.
CLOD CRUSHER.
No. 472,770. Patented Apr. 12, 1892.
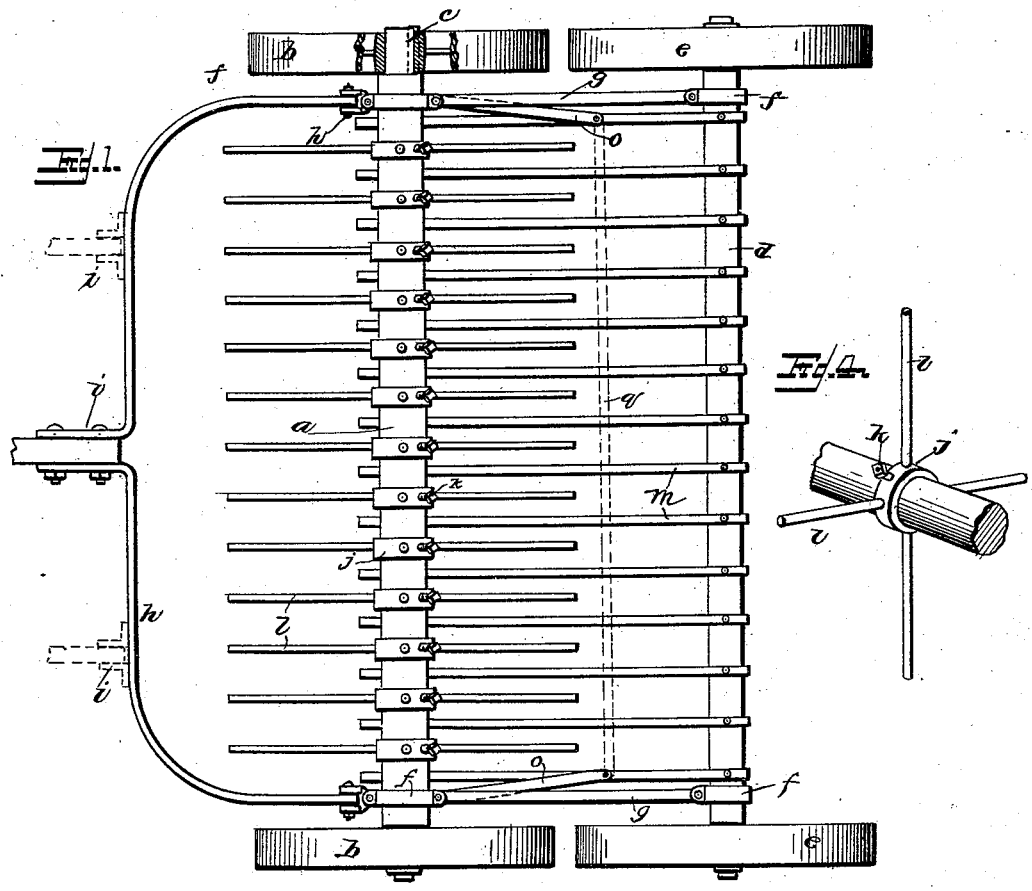
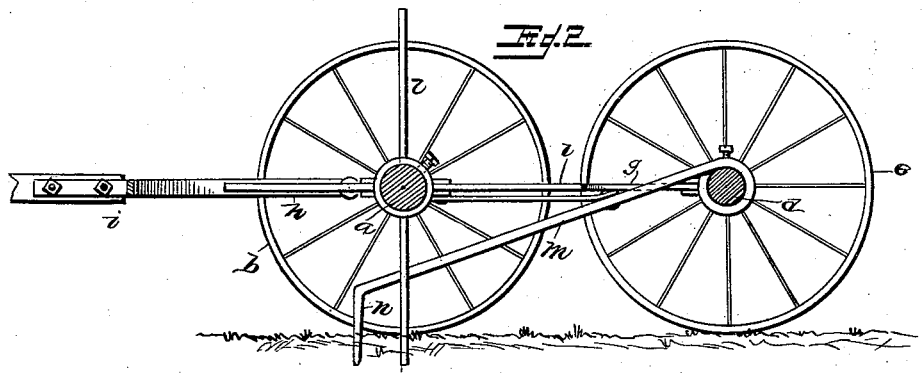
WITNESSES:
INVENTOR:
William Rapp,
BY Collamer & Co.
ATTORNEYS.

UNITED STATES PATENT OFFICE.

WILLIAM RAPP, OF TERRE HAUTE, OHIO.

CLOD-CRUSHER.

SPECIFICATION forming part of Letters Patent No. 472,770, dated April 12, 1892.

Application filed January 12, 1892. Serial No. 417,897. (No model.)

*To all whom it may concern:*

Be it known that I, WILLIAM RAPP, a citizen of the United States, residing at Terre Haute, in the county of Champaign and State of Ohio, have invented certain new and useful Improvements in Clod-Crushers; and I do hereby declare the following to be a full, clear, and exact description of the invention, such as will enable others skilled in the art to which it appertains to make and use the same.

This invention relates to harrows and diggers of that class known as "clod-crushers;" and the object of the same is to produce a cheap, strong, light, and serviceable machine of the class mentioned.

To this end the invention consists in the construction hereinafter more fully described and claimed, and as illustrated on the accompanying sheet of drawings, wherein—

Figure 1 is a plan view of the machine complete. Fig. 2 is a central longitudinal section. Fig. 3 is a perspective detail of one tooth, its brace, and the sleeve. Fig. 4 is a similar detail of one of the rotary diggers.

In the accompanying drawings I have illustrated what I consider the best adaptation of my invention, with the parts of the device drawn approximately to scale, so as to give the relative proportions, although I do not wish to be limited to the exact shape and size thereof.

The machine will be preferably entirely of metal, suitably connected where not specifically described in order to give it the strength necessary to withstand the strain incident to its use.

In size the entire machine is such that it may be drawn by one horse, and I have outlined a pair of thills attached to the front axle for this purpose, although of course the machine could be made in larger and smaller sizes, according to the amount of work to be done, and, if larger, more teeth and diggers would be added, as will be understood. The specific construction I prefer is as follows:

*a* is the front axle, about five feet in length, and *b* are the wheels, one of which is keyed to the axle, as at *c*, while the other is loose thereon, thus causing the axle to revolve with the progression of the machine, but permitting the turning of corners.

*d* is the rear axle, and *e* are the rear wheels journaled thereon.

All the wheels are about two feet in diameter, and those at each side stand in the same longitudinal line and travel with their adjacent sides quite near each other. On each axle, near each wheel, is journaled a sleeve *f*, the sleeves being connected in pairs by longitudinal braces *g*, which take the place of the reach in ordinary vehicles. Connected with the front sleeves are the hounds *h*, to which is attached the pole or thills *i* for drawing the machine.

Mounted on the front axle are several collars *j*, which are caused to revolve therewith by set-screws *k* taking through the collars and bearing against the axle, and each collar forms the hub of a rotary digger, whose arms are four in number and radial to the hub, like the plus sign, as seen at *l*. Secured in any suitable manner to the rear axle are teeth *m*, about thirty inches in length, and each tooth extends forward and slightly downward and at its front end turns sharply down, as at *n*, so as to embed the earth about two inches at a point directly beneath the front axle and midway between the two adjacent diggers *l*.

*o* are inclined braces—one at each side of the machine—connected with the front sleeve and led down to and connected with the tooth, as at *p*, and, if desired, I may extend a transverse brace *q* across the machine, as in dotted lines, and connect it with all the teeth to give them firmness and rigidity.

The machine may, if desired, be provided with a driver's seat, although I have not shown it; but with the dimensions as above given a seat would probably give the device too great weight.

The weight of the parts is sufficient to cause the machine to operate successfully.

In operation the machine is drawn over lately-plowed or other rough and uneven ground filled with clods which it is desired to disintegrate. The revolving diggers *l* dig into the clods, while the downturned points *n* of the teeth *m* travel beneath the surface and stir up the soil; yet they are sufficiently resilient to spring, if necessary, when an obstruction— such as a root—is encountered. By reason of the fact that the diggers and teeth are alternated the ground (with the diggers four inches apart) will be stirred at every two inches, and hence the clods will be reduced to sizes which can be manipulated by the ordinary harrow.

What is claimed as new is—

1. A clod-crusher comprising a front axle, supporting-wheels therefor, one of which is fast thereon, cross-shaped diggers mounted on and revolving with said axle, a rear axle connected with the front and supported by wheels, and teeth secured at their rear ends to said rear axle, extending forward and downward, and turned down below the earth at points under the front axle and between said diggers, as set forth.

2. A clod-crusher comprising a front axle mounted on wheels, diggers rotating with said axle, a rear axle, wheels journaled thereon, teeth connected with said rear axle, extending forward and downward, and turned down below the earth at points under the front axle and between said diggers, sleeves on the front axle, and braces leading from said sleeves to the outside teeth, as set forth.

3. A clod-crusher comprising a rotating front axle having sleeves journaled thereon near its wheels, a rear axle also having sleeves and whose wheels are journaled thereon, longitudinal braces connecting said sleeves in pairs, the hounds connected to the front sleeves, diggers revolving with the front axle, and teeth leading from the rear axle to points below the front axle between the diggers, as set forth.

4. A clod-crusher comprising a front axle fast in one of its supporting-wheels, collars mounted on said axle and having radiating arms forming diggers, a set-screw through each collar, a rear axle rigidly connected with the front axle, and teeth depending from said rear axle in lines in rear of the spaces between the diggers, as set forth.

In testimony whereof I affix my signature in presence of two witnesses.

WM. RAPP.

Witnesses:
DAVID JINKINS,
JNO. NEERE.